G. GORMAN.
Stalk-Chopper.
No. 10,043.
Patented Sept. 20, 1853.
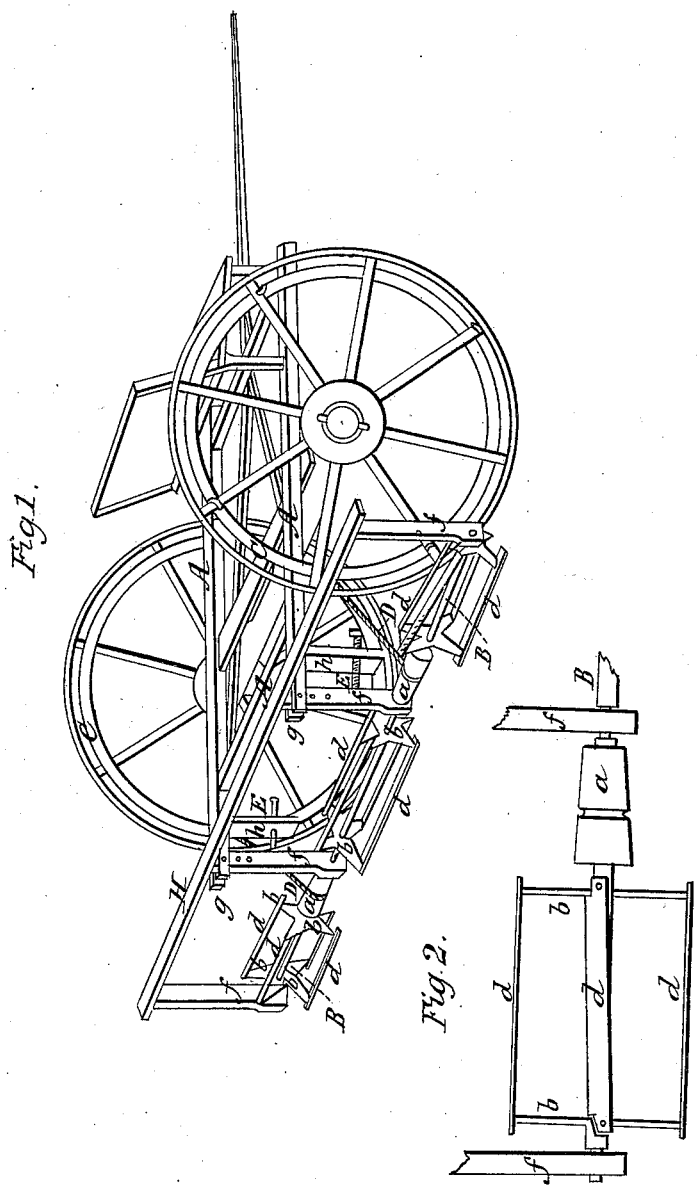

UNITED STATES PATENT OFFICE.

GEORGE GORMAN, OF LAMAR, MISSISSIPPI.

IMPROVEMENT IN COTTON-STALK CUTTERS AND PULVERIZERS.

Specification forming part of Letters Patent No. 10,043, dated September 20, 1853.

*To all whom it may concern:*

Be it known that I, GEO. GORMAN, of Lamar, in the county of Marshall and State of Mississippi, have invented a new and useful Machine for Harvesting Cotton-Stalks and Topping the Green Stalks; and I do hereby declare that the following is a full, clear, and exact description of the construction and operation of the same, reference being had to the annexed drawings, making a part of this specification.

The object of my invention is, by a properly-constructed and simple machine, propelled by the power of horses, to obviate one of the most tedious and laborious kinds of labor performed in the course of a year on a farm devoted to the culture of cotton, and as it is generally performed in the coldest weather the sufferings of those employed is very great, whereas by the employment of my machine a driver comfortably seated thereon and a pair of good horses is able to clear an acre of ground in ten minutes, and thus save the labor and exposure of forty or fifty hands, besides doing the work in a superior manner, as the stalks are not only removed, reduced, or cut up before they reach the earth, but rendered valuable as a manure by being in the best possible condition for improving the land, while at the same time offering no obstruction to the plow in turning the land. It may also be used at the proper season for topping cotton, it only being necessary to elevate the whippers or reels to the proper height, and the surplus top of the green stalk may be removed.

In the accompanying drawings, A A represent the frame-work placed on the front wheels of a wagon or other vehicle.

C C are grooved circles of a less diameter than the wheels, attached to the spokes thereof by screw-clamps. These circles constitute driving-wheels, and communicate motion, by means of chains or bands D D, to the pulleys *a a*, fastened on the iron shaft B B. On this shaft are secured three whippers, one for each row of cotton-stalks, formed like reels, (see Fig. 2,) and composed of radial spokes *b b b b*, connected by blades or cutters *d d*, extended between and secured on the ends of said spokes. With the view of giving obliquity to the cut of the blades, one set of spokes of each reel or whipper is placed slightly in advance of the other, and thus produce a diagonal rotation of the blade *d* to the shaft B, by which the cut is made easier in the reduction of the stalk and branches before they reach the ground, this being necessary, as frequently the earth is frozen, and the stalks falling between the ridges would escape the operation of cutting in other machines.

E E are tightening-screws passing through descending pieces *h h*, secured on the under side of A A, by means of which the chains may be tightened and made to actuate the pulleys *a a* and shaft B.

H represents the cross-piece, and *f f f f* four descending pieces or arms therefrom, in the lower ends of which is passed the bar B, carrying the pulleys and whippers thereon. This frame is suspended from the rear of the frame A A by the middle posts, *f f*, passing through slots *g g* in the ends of the side pieces of said framing, and by suitable bolts or pins is secured at any desired height from the ground.

The operation of the machine is as follows: Being propelled forward by a pair of horses at a brisk pace, the driver, comfortably seated on the front of the frame-work, directs the whippers over each row of stalks, by which they are rapidly and effectually reduced by the blades of the whippers before reaching the earth to the best condition for improvement of the land, and prevented from offering obstruction to the plow in the after cultivation of the land.

In very dry stalks bars of iron may be substituted for the blades; but in topping stalks the blades alone can be used.

Having described the nature and operation of my improvement, what I claim as my invention, and desire to secure by Letters Patent, is—

The construction and arrangement of the machine, consisting of rotary whippers *b* or reels on bar B B, supported in a frame admitting of elevation and depression, said whippers being driven by band-wheels C on one or both supporting-wheels of said machine, in the manner set forth, for the purpose of effectually reducing the stalks of cotton, and thus rendering them useful as a manure, and in a condition to offer no obstruction to the plow in the after cultivation of the land.

In testimony whereof I have signed my name before two subscribing witnesses.

GEORGE GORMAN.

Witnesses:
RICHD. PACKETT,
COLWELL P. POOL.